United States Patent
Calle et al.

(10) Patent No.: US 6,915,480 B2
(45) Date of Patent: Jul. 5, 2005

(54) PROCESSOR WITH PACKET DATA FLUSHING FEATURE

(75) Inventors: Mauricio Calle, Austin, TX (US); Joel R. Davidson, Austin, TX (US); James T. Kirk, Austin, TX (US); Betty A. McDaniel, Austin, TX (US); Maurice A. Uebelhor, East Leander, TX (US)

(73) Assignee: Agere Systems Inc., Allentown, PA (US)

( * ) Notice: Subject to any disclaimer, the term of this patent is extended or adjusted under 35 U.S.C. 154(b) by 530 days.

(21) Appl. No.: 10/029,704

(22) Filed: Dec. 21, 2001

(65) Prior Publication Data

US 2003/0120991 A1 Jun. 26, 2003

(51) Int. Cl.⁷ ......................... H03M 13/00; G06F 11/00
(52) U.S. Cl. ...................................... 714/799; 714/774
(58) Field of Search ............................ 714/799, 774; 709/249, 250

(56) References Cited

U.S. PATENT DOCUMENTS 5,720,032 A * 2/1998 Picazo et al. .............. 709/250
6,115,394 A * 9/2000 Balachandran et al. ..... 370/477
6,754,200 B1 * 6/2004 Nishimura et al. ......... 370/349

* cited by examiner

Primary Examiner—Joseph D. Torres (57) ABSTRACT

A network processor or other type of processor includes first classification circuitry, scheduling circuitry and second classification circuitry. The first classification circuitry is configured to determine for a given packet received by the processor whether the packet has one or more errors. The scheduling circuitry in an illustrative embodiment receives an indication of the error determination made by the first classification circuitry, and based on the indication controls the dropping of the given packet from the processor memories if the packet has one or more errors, e.g., via a flush transmit command. The second classification circuitry, which may be implemented as a single classification engine or a set of such engines, may be configured to perform at least one classification operation for the given packet, e.g., if the packet is supplied thereto by the scheduling circuitry.

20 Claims, 4 Drawing Sheets

PROCESSOR WITH PACKET DATA FLUSHING FEATURE

FIELD OF THE INVENTION

The present invention relates generally to packet processing systems, and more particularly to a network processor or other type of processor configured for use in performing packet routing, packet switching and other packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

In performing packet processing operations such as routing or switching, the network processor typically must first classify the packet, i.e., determine what type of packet it is and the appropriate routing and switching operations to be applied. Such determinations are typically implemented at least in part by a network processor element commonly referred to as a classifier or classification engine. As part of the above-noted determinations, a determination may be made to drop a packet, e.g., because the packet contains frame errors, is missing a start of packet (SOP) or end of packet (EOP) indicator, is too large, or otherwise exhibits one or more errors.

A significant problem that can often arise in conventional network processors is that packets with errors tend to tie up substantial amounts of valuable classification resources before being dropped. For example, a classifier in a conventional network processor may be responsible for making a decision as to whether a given packet will be dropped. However, in the case of a multi-stage or pipelined classifier, such a classifier is typically configured such that the packet drop decision is not made until after the packet has gone through substantially all of the classification stages or pipelines of the classifier. Known techniques for dropping packets in a network processor are therefore deficient in that they often require excessive classifier resources. This can increase the size, cost and complexity of the network processor.

It is therefore apparent that a need exists for improved techniques for identifying and dropping packets with errors, in a network processor or other type of processor, in a manner which reduces the amount of classification resources consumed in processing the dropped packets.

SUMMARY OF THE INVENTION

The invention provides improved techniques for dropping packets in a network processor or other type of processor, in a manner which prevents packets that are to be dropped from consuming excessive amounts of classification resources.

In accordance with one aspect of the invention, a network processor or other type of processor includes at least first classification circuitry, scheduling circuitry and second classification circuitry.

The first classification circuitry, which may be implemented in an illustrative embodiment as a preclassifier coupled to both a protocol data unit (PDU) buffer memory and a queuing and dispatch buffer memory, is configured to determine for a given packet received by the processor whether the packet has an error.

The scheduling circuitry in the illustrative embodiment receives an indication of the error determination made by the first classification circuitry, and based on the error determination indication controls the dropping of the given packet from the processor memories if the packet has an error, e.g., via a flush transmit command directed to the PDU buffer memory and queuing and dispatch logic associated with the queuing and dispatch buffer memory.

The second classification circuitry, which may be implemented in the illustrative embodiment as a single classification engine or a set of such engines, may be configured to perform at least one classification operation for the given packet, e.g., if the packet is supplied thereto by the scheduling circuitry.

In accordance with another aspect of the invention, a given packet processed by the first classification circuitry is preferably storable substantially simultaneously in both the PDU buffer memory and the queuing and dispatch buffer memory.

In accordance with a further aspect of the invention, particular classification operations performed by at least one of the first and second classification circuitry are programmable via instructions or other software that may be supplied to the processor via an associated host device. This allows a programmer to specify the particular manner in which packets having one or more errors are to be processed so as to conserve classification resources in the processor.

The processor may be configured as a network processor integrated circuit to provide an interface between a network and a switch fabric in a router or switch.

Advantageously, the techniques of the invention prevent packets that have errors from consuming excessive classification resources, thereby improving the efficiency of the classification process, reducing the amount of classification resources required, and increasing processor throughput.

DETAILED DESCRIPTION OF THE INVENTION

The invention will be illustrated herein in conjunction with an exemplary packet processing system which includes a network processor configured in a particular manner. It should be understood, however, that the invention is more generally applicable to any processor in which it is desirable to reduce the amount of processor classification resources that are utilized in processing packets having one or more errors.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

The term "classification circuitry" as used herein is intended to include any portion of a processor or other type of processing circuitry which is capable of performing at least a portion of at least one classification operation on a packet or a portion of a packet. Examples of classification operations include, without limitation, preclassification, reassembly, prioritization, statistics gathering, scheduling, traffic management, etc. As a more particular example, an illustrative embodiment of the invention to be described below includes first classification circuitry configured to perform a first pass classification and second classification circuitry configured to perform a second pass classification. The first pass classification in this embodiment generally includes at least a portion of a packet reassembly operation, and the second pass classification in this embodiment generally includes at least a portion of a traffic management operation. The first and second classification circuitry may each represent, e.g., one or more separate classification engines, different portions of a single classification engine, or other arrangements of circuitry configured to provide at least a portion of the processing operations described herein.

The present invention in an illustrative embodiment is configured such that packets having one or more errors are flagged in conjunction with a first pass classification before being subject to a second pass classification. This arrangement advantageously allows the fall resources of the second pass classification to be utilized for those known "good" packets that do not contain errors, and prevents "bad" packets that are to be dropped from consuming excessive classification resources within the processor. As a result, the amount of classification resources required in the processor is considerably reduced, the processor throughput is increased, and the size, cost and complexity of the processor may be reduced.

Figure 1:
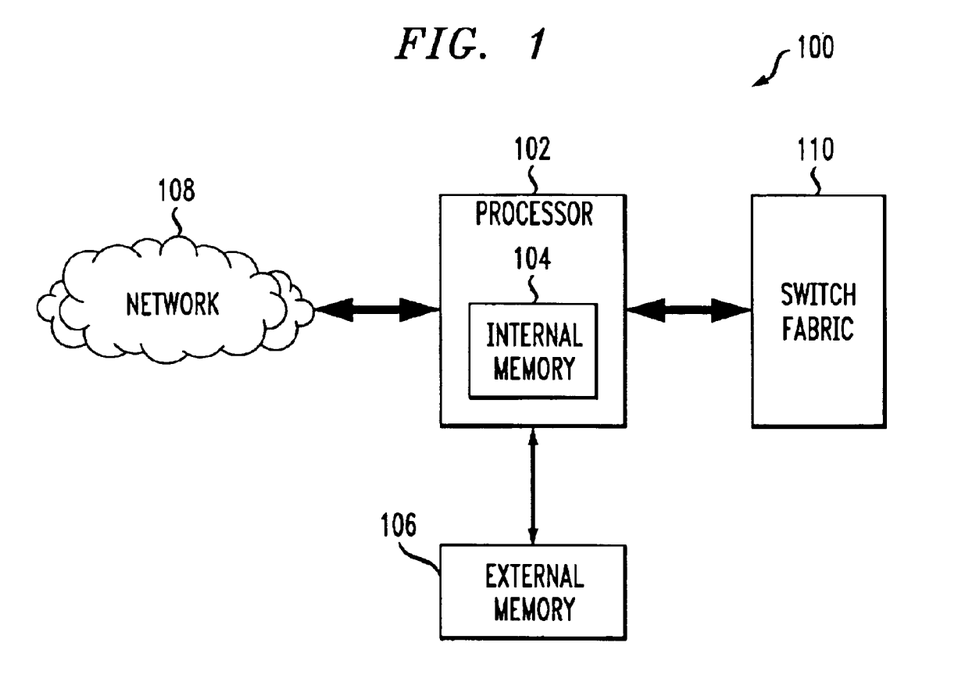
FIG. 1 is a simplified block diagram of a packet processing system in which the present invention is implemented.

FIG. 1 shows a packet processing system 100 in which the invention is implemented. The system 100 includes a network processor 102 having an internal memory 104. The network processor 102 is coupled to an external memory 106 as shown, and is configured to provide an interface between a network 108 from which cells, packets or other packet data are received and a switch fabric 110 which controls switching of packet data. The processor 102 and its associated external memory 106 may be implemented, e.g., as one or more integrated circuits installed on a line card or port card of a router or switch. In such a configuration, the switch fabric 110 is generally considered to be a part of the router or switch.

It should be understood that the particular arrangement of system elements shown in FIG. 1 is by way of illustrative example only. More particularly, as previously noted, the invention can be implemented in any type of packet processor, and is not limited to any particular packet processing application.

Figure 2:
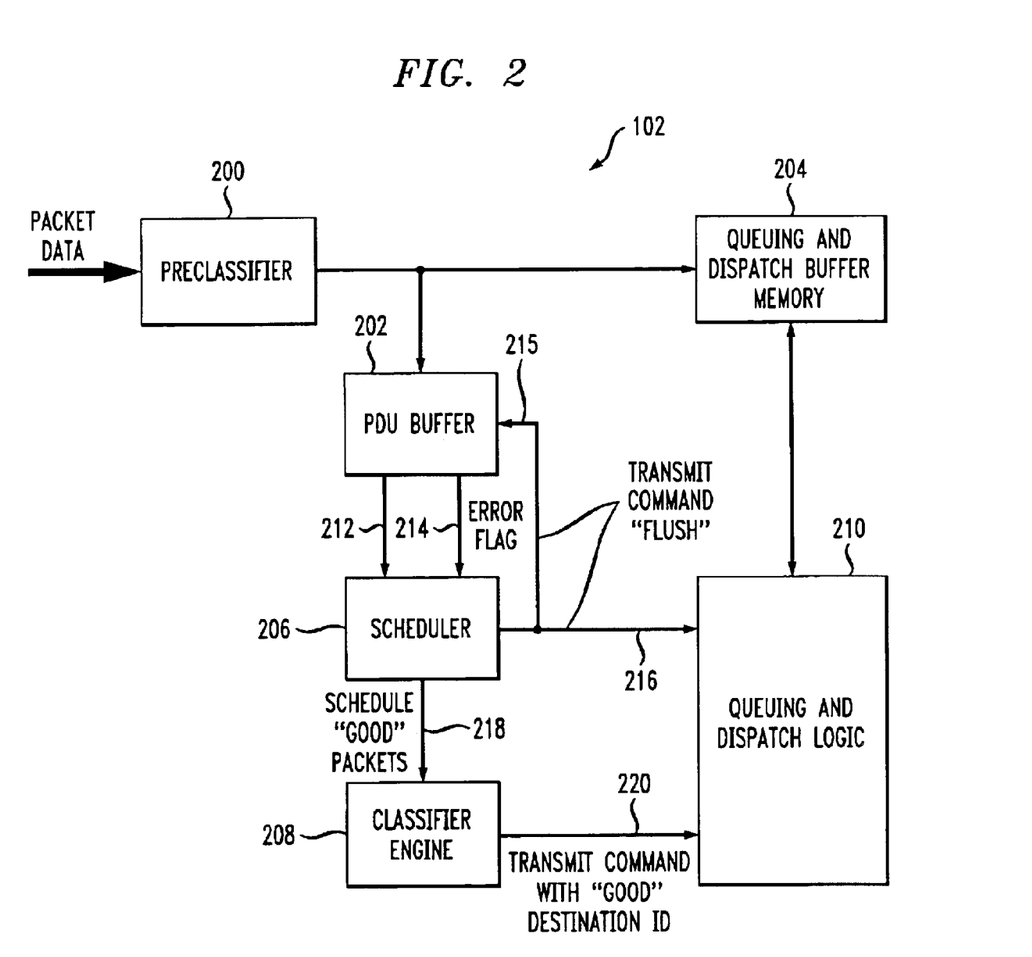
FIG. 2 is a more detailed view of a network processor of the FIG. 1 system configured in accordance with the techniques of the invention.

FIG. 2 shows the network processor 102 of FIG. 1 in greater detail. The network processor 102 in this embodiment includes a first pass classifier 200 which receives incoming packet data from the network 108 or the switch fabric 110. The first pass classifier 200 is coupled to a protocol data unit (PDU) buffer memory 202 and a queuing and dispatch buffer memory 204. A PDU in this embodiment corresponds generally to a packet, which may be generated, e.g., by reassembling cells or other packet data in a known manner. The network processor 102 further comprises a scheduler 206, a classifier engine 208, and queuing and dispatch logic 210.

The term "queuing and dispatch" as used herein should be construed as referring to at least one of queuing and dispatch, i.e., queuing or dispatch or both.

The memories 202, 204 of the network processor 102 may each comprise at least a portion of the internal memory 104, the external memory 106, or both. The term "memory circuitry" as used herein is intended to include a separate memory as well as a particular portion of a larger memory, and may refer to internal memory, external memory or combinations thereof.

The preclassifier 200 of FIG. 2 may be configured to perform at least one of a reassembly operation, a parity check and a priority determination for a given packet, while the classifier engine 208 performs at least one of a queuing operation and a dispatch operation. It is also possible that one or both of the classifiers 200, 208 may implement statistics gathering operations for use in scheduling and other traffic management functions. These and other operations of the classifiers 200, 208 may be implemented in a conventional manner using techniques well-known in the art, and are therefore not described in detail herein.

The preclassifier 200 and classifier engine 208 may also be referred to herein as a first pass classifier and a second pass classifier, respectively.

As indicated previously, the packet data received by the preclassifier 200 may comprise cells or other portions of the given packet that are to be reassembled to form the given packet using reassembly circuitry that may be incorporated into or otherwise associated with the preclassifier 200. The term "packet" as used herein is therefore intended to include not only a reassembled packet but also one or more cells or other packet data which when reassembled will form a packet.

Also, as indicated previously, different portions of each of the memories 202 and 204 may be implemented as separate memories, e.g., as portions of both the internal memory 104 and external memory 106 of FIG. 1, rather than each being implemented as a single memory in the manner shown in FIG. 2.

It is to be understood that the network processor 102 as shown in FIG. 2 is simplified for purposes of illustration, and in a given embodiment may include additional circuitry, such as one or more memory controllers, as well as appropriate interface circuitry for interfacing with the network 108, the switch fabric 110, and other external devices, such as an associated host processor or other device which communicates with the network processor 102 over a standard bus architecture, e.g., a peripheral component interconnect (PCI) bus.

In accordance with the present invention, the particular classification operations performed by one or both of the preclassifier 200 and the classifier engine 208 are preferably programmable via instructions or other software that may be supplied to the network processor 102 using conventional arrangements, such as the above-noted host processor. The preclassifier 200 in the illustrative embodiment of FIG. 2 is therefore distinguishable from, e.g., a hardware-based reassembler, although the invention in other embodiments can be implemented using these and other hardware-based elements.

In operation, the preclassifier 200 is configured to detect "bad" packets having one or more errors and to direct the setting of an error flag for such packets in the PDU buffer memory 202. For example, as indicated in FIG. 2, a bad packet directed to the PDU buffer memory 202 by the preclassifier 200 can have an associated error flag set in the PDU buffer memory. The bad packet and its associated error flag are passed to the scheduler 206 via respective connections 212 and 214 as shown. The scheduler 206 upon receipt of a bad packet, i.e., a packet having a set error flag, generates a "flush" command directing that the packet be dropped. The flush command is preferably supplied to the PDU buffer memory 202 and the queuing and dispatch logic 210 via respective connections 215 and 216. Upon receipt of the flush command, the corresponding packet can be removed or otherwise flushed from the PDU buffer memory 202 and the queuing and dispatch buffer memory 204.

An example of a flush command in accordance with the invention is a transmit command having a predetermined destination identifier (ID) which does not correspond to any actual destination ID, e.g., a destination ID of zero ("0").

Any "good" packets, i.e., packets for which the associated error flag is not set in the PDU buffer memory 202, are delivered by the scheduler 206 to the classifier engine 208 via connection 218 in accordance with a specified schedule. The classifier engine 208 then generates for a given good packet to be transmitted a transmit command specifying an appropriate destination ID for the good packet. This transmit command is then supplied to the queuing and dispatch logic 210 via connection 220. Good packets are thus not flagged by the PDU buffer memory 202 and the scheduler 206 sends them to the classifier engine 208 for performance of the above-noted second pass classification.

It should be noted that the invention does not require any particular error flag or other type of error indicator, nor any particular mechanism for setting, asserting or processing such indicators. Numerous error indicator arrangements suitable for use with the present invention will be readily apparent to those skilled in the art.

In accordance with the invention, a given packet processed by the preclassifier 200 is preferably stored substantially simultaneously in the PDU buffer memory 202 and the queuing and dispatch buffer memory 204. As a result of this storage arrangement, the classifier 208 does not need to process a given packet in order for that packet to be accessible to the queuing and dispatch logic 210. Instead, the queuing and dispatch logic can respond directly to the flush command from the scheduler 206 and control the flushing or removal of a bad packet from the queuing and dispatch buffer memory 204. As indicated above, the flush command is also operative to direct a similar removal of the packet from the PDU buffer memory 202. The generation of the flush command by the scheduler 206 thus ensures that the flushing of the bad packet can occur at an early stage, prior to the expenditure of any classification resources in the classifier engine 208.

It is to be appreciated that the particular flush command signaling shown in FIG. 2 is by way of example only. Other arrangements can also be used, as will be apparent to those skilled in the art. As another example, the flush command may be transmitted directly to the queuing and dispatch buffer memory 204 rather than to the queuing and dispatch logic 210 as shown in FIG. 2.

Furthermore, the particular manner in which a bad packet is removed, overwritten or otherwise flushed from the memories 202, 204 of the network processor 102 should not be considered a limitation of the invention. Any suitable technique for dropping the bad packet from the network processor memories 202, 204 in a manner consistent with the described conservation of classification resources may be used. For example, in another embodiment of the invention, at least a portion of a packet that is determined to have one or more errors could be supplied by the scheduler 206 to the classifier 208 and dropped in the classifier prior to the classifier performing any classification operations on the packet.

The preclassifier 200 is preferably configured to detect one or more packet errors in the form of, e.g., frame errors, partial packets with missing start of packet (SOP) or end of packet (EOP) indicators, out of range or "too large" packets, time-out packets, etc. These errors when detected by the preclassifier 200 are made apparent to the PDU buffer memory 202, e.g., by storage or other type of assertion of an appropriate error flag. The corresponding bad packets when delivered to the scheduler 206 have their corresponding error flags set, which causes the scheduler to generate the above-noted flush commands for delivery to the PDU buffer memory 202 and the queuing and dispatch logic 210, which in turns leads to the dropping of the bad packets.

Figure 3:
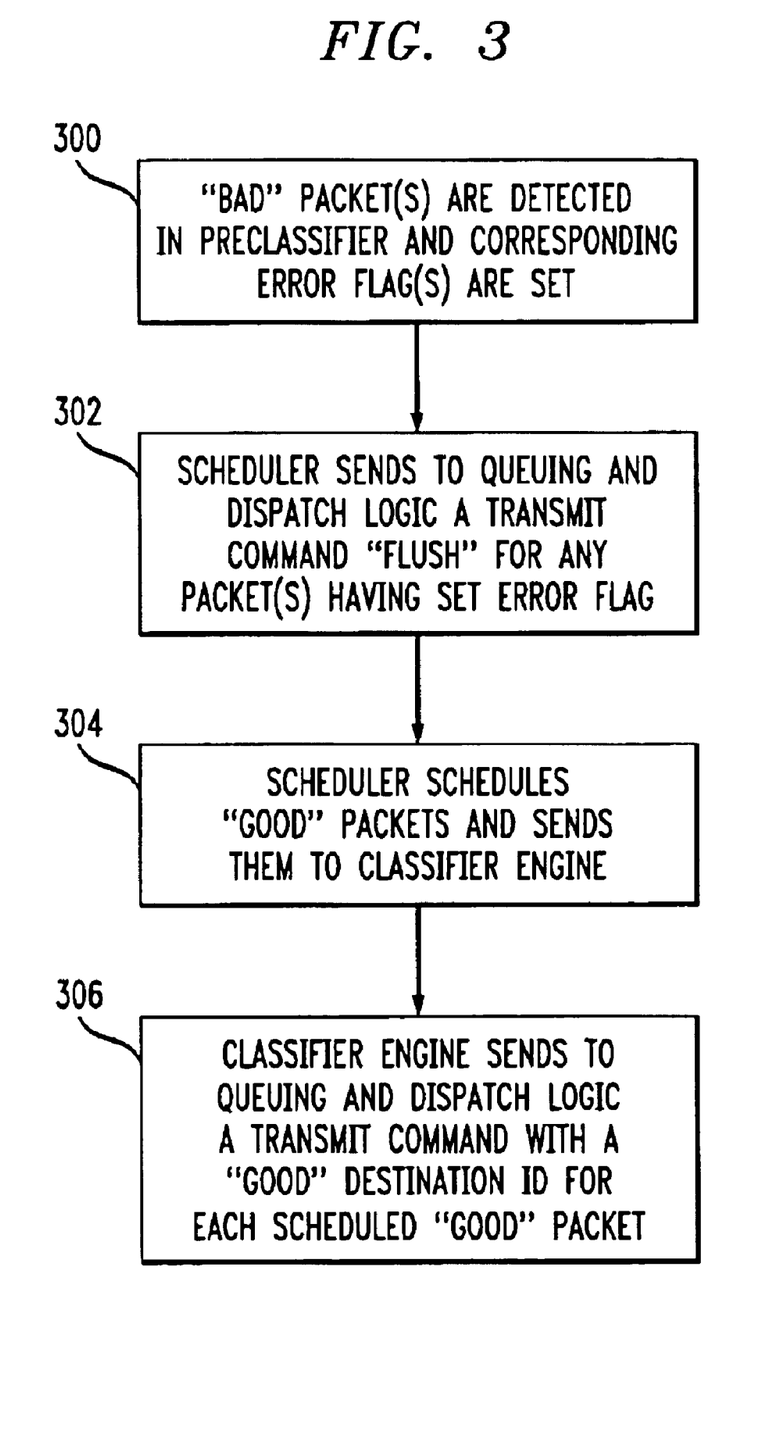
FIG. 3 is a flow diagram of a packet classification and storage process that is implementable in the FIG. 1 system by the FIG. 2 network processor in accordance with the invention.

FIG. 3 is a flow diagram which summarizes the above-described illustrative packet classification and storage process. In step 300, bad packets are detected in the preclassifier 200 and corresponding error flags are set. The scheduler 206 in step 302 then sends to the queuing and dispatch logic 210 the above-noted "flush" transmit command for any packet having a set error flag. Although not indicated in the figure, the flush command is also preferably sent to the PDU buffer memory 202, such that the packet can be flushed from both the PDU buffer memory 202 and the queuing and dispatch buffer memory 204. In step 304, the scheduler schedules good packets, i.e., packets without set error flags, and sends them to the classification engine 208. The classification engine 208 in step 306 sends to the queuing and dispatch logic 210 a transmit command with a "good" destination ID for each scheduled good packet.

The steps of the FIG. 3 process may be repeated sequentially for each packet to be processed, or the packets may be processed in groups of multiple packets at each of the steps, followed by repeating of the steps for other groups of multiple packets. The particular steps shown in FIG. 3 should be considered as examples of packet processing in accordance with the illustrative embodiment of FIG. 2, rather than as limiting the scope of the invention in any way.

Figure 4:
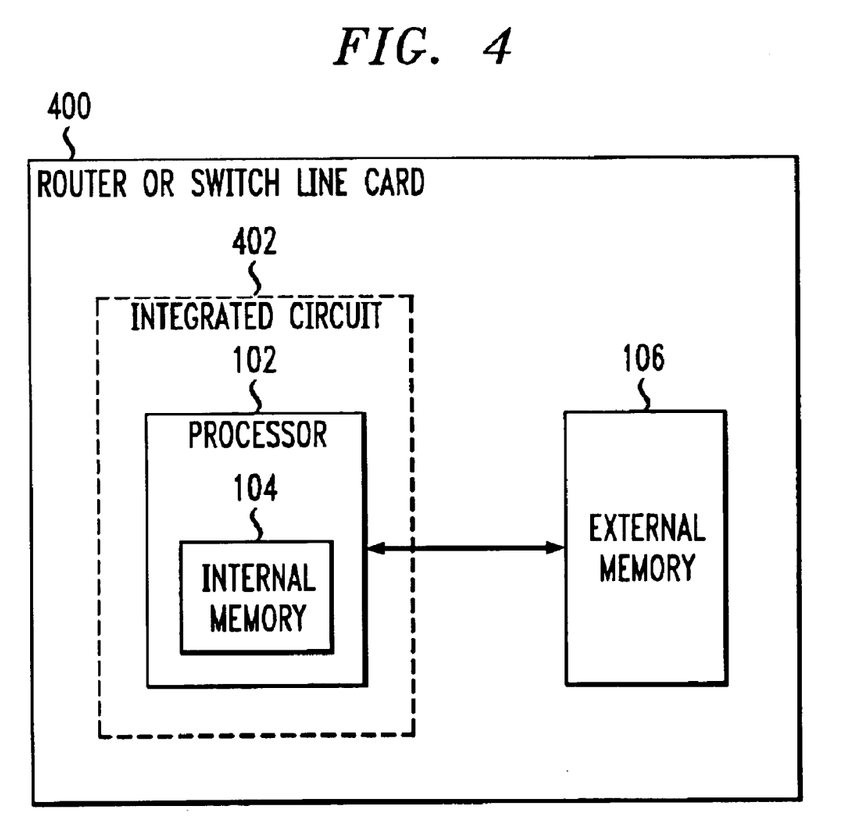
FIG. 4 illustrates one possible implementation of the FIG. 2 network processor as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 may serve, e.g., as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

The above-described embodiments of the invention are intended to be illustrative only. For example, although the illustrative embodiment of FIG. 2 utilizes separate first pass and second pass classifiers, i.e., preclassifier 200 and classifier engine 208, other embodiments may combine the functionality of these elements into a single classification engine, set of classification engines, or other type of classification circuitry. In addition, although the memories 202, 204 are illustratively at least in part internal to the network processor in the embodiments described above, this is by way of example only. Other embodiments can use different types of internal or external memory circuitry configurations for implementing the described functionality. Furthermore, as mentioned previously, the particular classification operations of the classification circuitry can be varied depending upon the processing application, e.g., under software control via a host processor. These and numerous other alternative embodiments within the scope of the following claims will be apparent to those skilled in the art.

What is claimed is:

1. A processor comprising:

first classification circuitry configurable to determine for a given packet the processor whether the packet has one or more errors;

the first classification circuitry storing the given packet in both first memory circuitry and second memory circuitry, wherein the given packet is stored in the first memory circuitry with an indication of the error determination made by the first classification circuitry;

scheduling circuitry coupled to the first memory circuitry and adapted to receive therefrom the given packet and the indication of the error determination made by the first classification circuitry;

second classification circuitry coupled to the scheduling circuitry, the second classification circuitry receiving the given packet from the scheduling circuitry if the error determination indication meets one or more specified criteria; and logic circuitry having inputs coupled to respective outputs of the scheduling circuitry and the second classification circuitry, the logic circuitry controlling the dispatch of the given packet from the second memory circuitry responsive to signals from the scheduling circuitry and the second classification circuitry;

wherein if the error determination indication does not meet the one or more specified criteria, the given packet is dropped from the first memory circuitry and the second memory circuitry responsive to one or more signals from the scheduling circuitry.

2. The processor of claim 1 wherein the scheduling circuitry is configurable based on the indication of the error determination to control the dropping of the packet if the packet has one or more errors.

3. The processor of claim 1 wherein the scheduling circuitry is configurable based on the indication of the error determination to direct the given packet to the second classification circuitry if the packet does not have one or more errors, the second classification circuitry being configurable to perform at least one classification operation for the given packet if the packet is supplied thereto by the scheduling circuitry.

4. The processor of claim 1 wherein the processor is configured to provide an interface for communication of the packet between a network and a switch fabric.

5. The processor of claim 1 wherein particular classification operations performed by at least one of the first and second classification circuitry are programmable via software deliverable to the processor via an associated host device.

6. The processor of claim 1 wherein the first classification circuitry comprises a preclassifier configured to perform at least a portion of at least one of a reassembly operation, a parity check and a priority determination for the given packet.

7. The processor of claim 1 wherein the second classification circuitry comprises at least one classifier engine configured to generate a transmit command specifying a destination identifier for the given packet as supplied thereto by the scheduling circuitry if the packet does not have one or more errors.

8. The processor of claim 1 further comprising the first memory circuitry and the second memory circuitry, at least a portion of the packet being storable substantially simultaneously in the first and second memory circuitry.

9. The processor of claim 1 wherein the first memory circuitry and the second memory circuitry comprise different portions of a single memory internal to the processor.

10. The processor of claim 1 wherein the first memory circuitry and the second memory circuitry comprise different memories, at least one of which is internal to the processor.

11. The processor of claim 1 wherein the first memory circuitry comprises a queuing and dispatch buffer memory of the processor.

12. The processor of claim 1 wherein the second memory circuitry comprises a packet buffer memory of the processor.

13. The processor of claim 1 wherein the logic circuitry comprises queuing and dispatch logic circuitry coupled to at least the scheduling circuitry and the second classifier circuitry, the queuing and dispatch logic receiving from the scheduling circuitry a flush command directing that the packet be dropped if the packet has one or more errors, and receiving from the second classification circuitry a transmit command directing that the packet be transmitted to a particular destination if the packet does not have one or more errors.

14. The processor of claim 1 wherein the indication of the error determination made by the first classification circuitry comprises an error flag, the error flag being set in the first memory circuitry and supplied therefrom to the scheduling circuitry.

15. The processor of claim 1 wherein one or more parameters associated with at least one operation of at least one of the first classification circuitry, the scheduling circuitry and the second classification circuitry are determined in accordance with one or more instructions provided to the processor under control of a host device operatively coupled to the processor.

16. The processor of claim 1 wherein the processor comprises a network processor.

17. The processor of claim 1 wherein the processor is configured as an integrated circuit.

18. A method for use in a processor comprising first and second classification circuitry coupled to scheduling circuitry, the method comprising the steps of:

determining in the first classification circuitry, for a given packet, whether the packet has one or more errors, the first classification circuitry generating an indication of the error determination, the error determination indication being made accessible to the scheduling circuitry;

storing the given packet in both first memory circuitry and second memory circuitry, wherein the given packet is stored in the first memory circuitry with an indication of the error determination made by the first classification circuitry;

receiving, in the scheduling circuitry from the first memory circuitry, the given packet and the indication of the error determination made by the first classification circuitry;

receiving, in the second classification circuitry from the scheduling circuitry, the given packet if the error determination indication meets one or more specified criteria; and controlling the dispatch of the given packet from the second memory circuitry responsive to signals from the scheduling circuitry and the second classification circuitry;

wherein if the error determination indication does not meet the one or more specified criteria, the given packet is dropped from the first memory circuitry and the second memory circuitry responsive to one or more signals from the scheduling circuitry.

19. The method of claim 18 further including the step of performing in the second classification circuitry at least one classification operation for the given packet if the packet is supplied thereto by the scheduling circuitry.

20. An integrated circuit comprising:

first classification circuitry configurable to determine for a given packet whether the packet has one or more errors;

the first classification circuitry storing the given packet in both first memory circuitry and second memory circuitry, wherein the given packet is stored in the first memory circuitry with an indication of the error determination made by the first classification circuitry;

scheduling circuitry coupled to the first memory circuitry and adapted to receive therefrom the given packet and the indication of the error determination made by the first classification circuitry;

second classification circuitry coupled to the scheduling circuitry, the second classification circuitry receiving the given packet from the scheduling circuitry only if the error determination indication meets one or more specified criteria; and logic circuitry having inputs coupled to respective outputs of the scheduling circuitry and the second classification circuitry, the logic circuitry controlling the dispatch of the given packet from the second memory circuitry responsive to signals from the scheduling circuitry and the second classification circuitry;

wherein if the error determination indication does not meet the one or more specified criteria, the scheduling circuitry (i) controls the first memory circuitry such that the given packet is flushed from the first memory circuitry, and (ii) directs the logic circuitry to flush the given packet from the second memory circuitry.

* * * * *

UNITED STATES PATENT AND TRADEMARK OFFICE
CERTIFICATE OF CORRECTION

PATENT NO.    : 6,915,480 B2
DATED         : July 5, 2005
INVENTOR(S)   : M. Calle et al.

It is certified that error appears in the above-identified patent and that said Letters Patent is hereby corrected as shown below:

Column 7,
Line 20, after "given packet", delete "the processor".

Signed and Sealed this

Thirtieth Day of August, 2005

JON W. DUDAS
*Director of the United States Patent and Trademark Office*